United States Patent
Loh et al.

(10) Patent No.: US 10,540,290 B2
(45) Date of Patent: Jan. 21, 2020

(54) METHOD AND APPARATUS FOR TRANSLATION LOOKASIDE BUFFER WITH MULTIPLE COMPRESSED ENCODINGS

(71) Applicants: ATI Technologies ULC, Markham (CA); Advanced Micro Devices, Inc., Sunnyvale, CA (US)

(72) Inventors: Gabriel H Loh, Bellevue, WA (US); Jimshed Mirza, Toronto (CA)

(73) Assignees: ATI Technologies ULC, Markham, Ontario (CA); Advanced Micro Devices, Inc., Santa Clara, CA (US)

( * ) Notice: Subject to any disclaimer, the term of this patent is extended or adjusted under 35 U.S.C. 154(b) by 389 days.

(21) Appl. No.: 15/139,902

(22) Filed: Apr. 27, 2016

(65) Prior Publication Data
US 2017/0315927 A1    Nov. 2, 2017

(51) Int. Cl.
*G06F 12/00* (2006.01)
*G06F 12/1027* (2016.01)
*G06F 12/1009* (2016.01)

(52) U.S. Cl.
CPC ...... *G06F 12/1027* (2013.01); *G06F 12/1009* (2013.01); *G06F 2212/401* (2013.01); *G06F 2212/656* (2013.01)

(58) Field of Classification Search
None
See application file for complete search history.

(56) References Cited

U.S. PATENT DOCUMENTS

| 8,700,865 B1 * | 4/2014 | Van Dyke | G06F 12/08 711/147 |
| 9,569,348 B1 * | 2/2017 | Deming | G06F 12/10 |
| 2014/0237189 A1 * | 8/2014 | Glasco | G06F 12/0875 711/133 |

OTHER PUBLICATIONS

Pham, Binh et al.; Increasing TLB Reach by Exploiting Clustering in Page Translations; 2014 IEEE 20th International Symposium on High Performance Computer Architecture; Feb. 2014.
Pham, Binh et al.; CoLT: Coalesced Large-Reach TLBs; 2012 45th Annual IEEE/ACM International Symposium on Microarchitecture; Dec. 2012.

* cited by examiner

*Primary Examiner* — Daniel D Tsui
(74) *Attorney, Agent, or Firm* — Faegre Baker Daniels LLP (57) ABSTRACT

Methods and apparatus obtain one or more system page table entries that represent virtual system (e.g., memory) page to physical system page translations. A number of the obtained system page table entries that can be encoded in each of a plurality of translation lookaside buffer (TLB) entry encoding formats are determined. The method and apparatus may select one of the TLB entry encoding formats that encode a number of the obtained system page table entries. The method and apparatus may encode a number of obtained system page table entries in the TLB entry encoding format selected into a compressed encoding format TLB entry. The method and apparatus may associate the compressed encoding format TLB entry with an encoding format indication of the encoding format selected. The method and apparatus may decode a compressed encoding format TLB entry based on a determined TLB entry encoding format.

17 Claims, 10 Drawing Sheets

METHOD AND APPARATUS FOR TRANSLATION LOOKASIDE BUFFER WITH MULTIPLE COMPRESSED ENCODINGS

BACKGROUND OF THE DISCLOSURE

The disclosure relates generally to methods and apparatus that support multiple compressed encodings within a translation lookaside buffer.

Computing devices, such as central processing units (CPUs) and graphics processing units (GPUs), typically include translation lookaside buffers (TLBs) that allow for the retrieval of recent virtual memory address to physical memory address translations (e.g., virtual system page to physical system page translations). Such translations are necessary when, for example, executing programs reference a virtual memory address which then has to be translated to a physical memory address. A virtual memory address may reside, for example, in a guest physical page (GPP), while a physical memory address may reside, for example, in a system physical page (SPP). Typically, the TLB is in the form of a memory cache that stores recent translations to allow for a quicker retrieval of such a translation. When a virtual memory address to a physical memory address is referenced, the TLB is searched to see if the translation, in the form of a TLB entry, is available. If it is not available in the TLB, known in the art as a "TLB miss," system page table entries (PTEs) in physical memory are searched with what is known in the art as a memory page-table walk (e.g., memory page crawl). This operation is performed by a hardware page table walker, as known in the art. In addition, the translation may be stored in the TLB for future reference. If, however, the translation is available in the TLB, known in the art as a "TLB hit," the physical address is provided without having to search the physical memory. Thus, the translation is achieved much faster, as the memory page-table walk operation is avoided.

In addition, TLB performance is critical in many situations, especially as memory sizes continue to increase while memory page sizes remain at 4 kilo-byte pages. Reducing TLB misses directly improves performance (i.e., no delays waiting for translations from memory page-table walks) and reduces energy consumption (i.e., no energy spent on memory page-table walks). To allow TLBs to include more TLB entries, current solutions allow for the compressing or combining of multiple TLB entries into a single TLB entry. These solutions propose different TLB encodings that enable the effective compression of multiple PTEs into a single TLB entry. Each type of encoding can provide effective compression of certain types of PTE patterns, and there are some patterns where not all encoding schemes can handle.

For example, the method of CoLT (Coalesced Large-reach TLBs) provides a way to combine (e.g., coalesce, encode) multiple TLB entries that have strictly sequential mappings. For example, if there are three virtual system page to physical system page translations such as V0->P4, V1->P5, V2->P6, where the source virtual pages V0, V1, V2 are all sequential, and the mapped-to physical pages P4, P5, P6 are also sequential, CoLT allows for the three translations to be combined into a single TLB entry with a format such as "{V0->P4},{3}" where the "3" indicates that the mapping applies to three consecutive/sequential mappings. This provides an improvement to the TLB by replacing what would otherwise require three TLB entries with just a single one.

Figure 1:
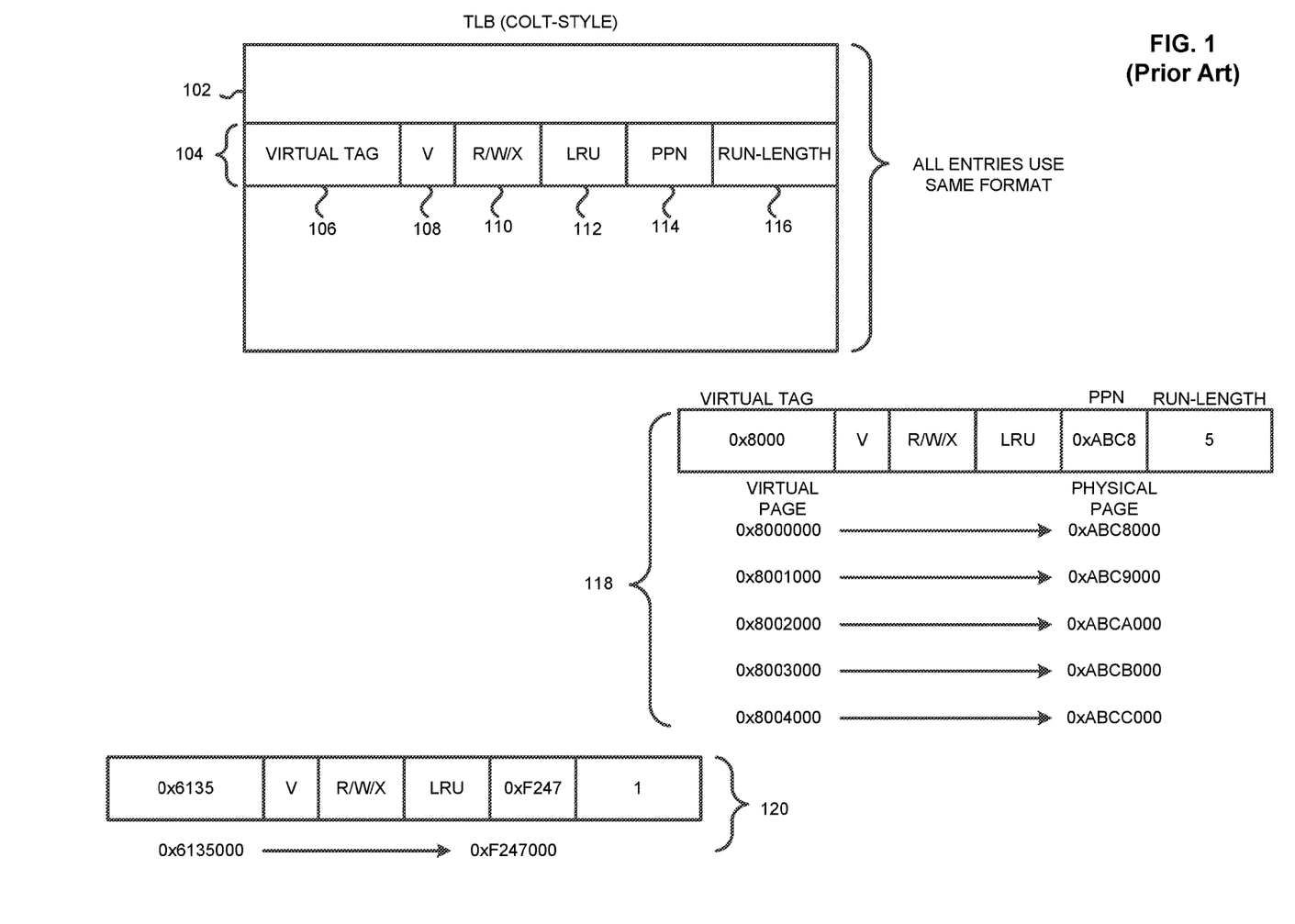
FIG. 1 is a prior art diagram illustrating a TLB that supports the CoLT encoding method.

FIG. 1 shows an example TLB 102 that supports the CoLT encoding method which allows for the compression or coalescing of multiple sequentially consecutive PTEs that all map to correspondingly sequentially consecutive physical pages. As shown, the TLB entry 104 includes a virtual tag field 106 corresponding to the virtual memory page(s) being translated by the PTE, a valid bit field (V) 108, read/write/execute memory page permission field 110 (CoLT requires all memory pages represented by the TLB entry to have the same memory page permissions), replacement metadata (LRU) 112, the physical memory base physical page number (PPN) 114, and a run-length field 116 indicating the number of sequential PTEs represented by this coalesced TLB entry. An example 118 of sequentially consecutive PTEs that can be encoded into a compressed TLB entry using the CoLT method is also shown in the figure. In this example, instead of using five separate conventional TLB entries, a single coalesced TLB entry is used, leaving other TLB entries available to store other translations. A compressed TLB entry using the CoLT method may be larger (i.e., take up more TLB entry memory space) than a conventional un-encoded TLB entry, as the CoLT method includes a run length field, as indicated in FIG. 1. Another example 120 shows a mapping where there is a single PTE entry (e.g., singleton) that is not able to be coalesced. In this case, the single PTE is cached in a TLB entry with the "run length" field set to one.

Another method, known as clustered TLBs, act in a somewhat similar fashion, but can encode multiple nearby or "clustered" mappings even if they are not strictly sequential (e.g., there may be gaps in the sequence, and some mappings may be "out of order"). The clustered TLB format can combine additional patterns that the CoLT approach cannot, but there are also patterns that the CoLT approach can encode that the clustered approach cannot. Each of these two methods has its own strengths and weaknesses. Furthermore, clustered TLB entries may also be larger than conventional un-encoded TLB entry methods. As such, other proposals include using two separate TLB structures (e.g., one for un-encoded TLB entries and another for clustered TLB entries), which introduces additional complexity and overheads.

Figure 2:
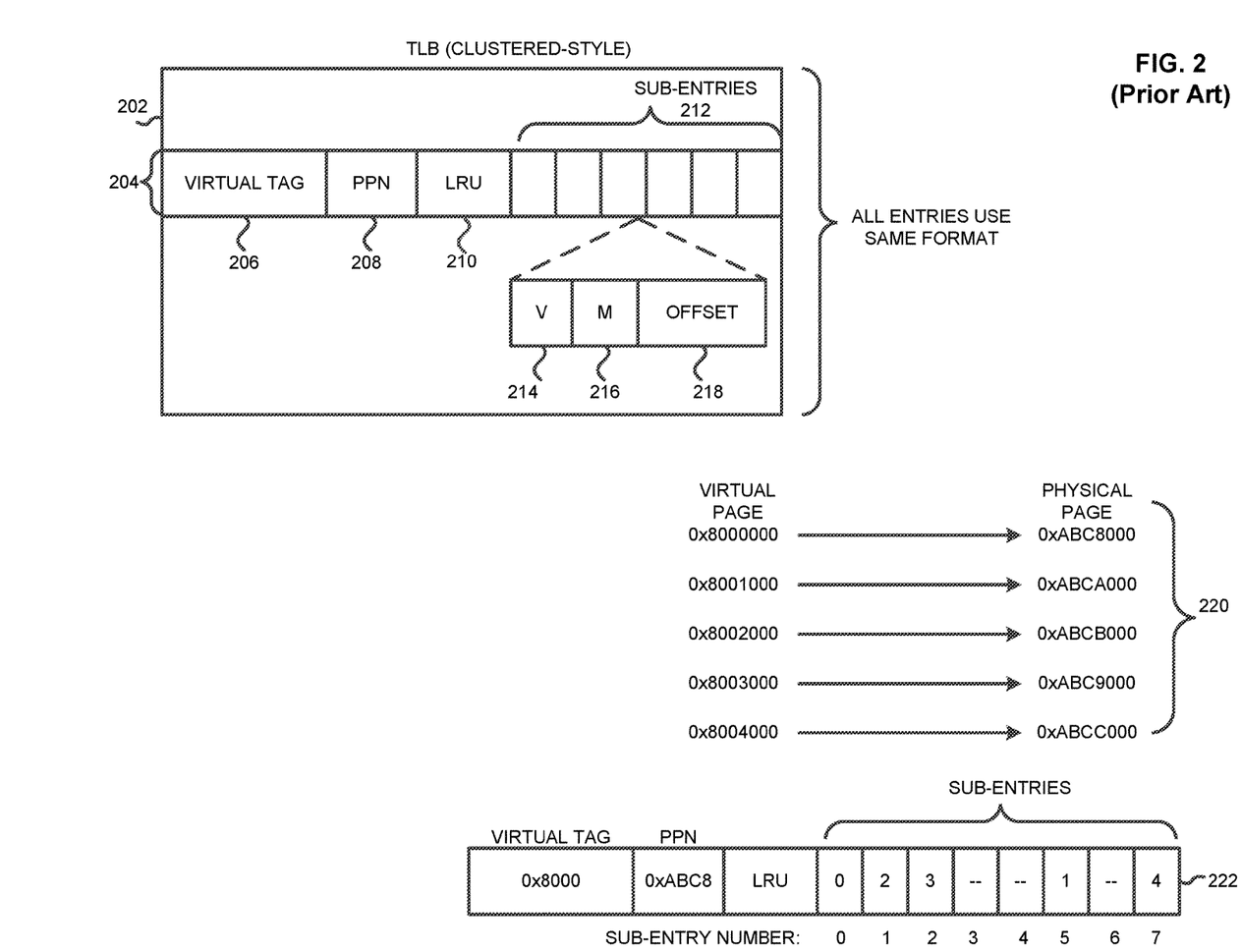
FIG. 2 is a prior art diagram illustrating a TLB that supports the clustered encoding method.

FIG. 2 shows an example TLB 202 that supports the clustered encoding approach allowing for the compression of multiple PTEs that map to physical pages that are not necessarily sequential in order. As shown, the TLB entry 204 includes a virtual tag field 206 corresponding to the virtual memory page(s) being translated by the PTE, a physical memory base physical page number (PPN) field 208, a read/write/execute memory page permission field 210, and sub-entries 212. As indicated in the figure, each sub-entry 212 includes a valid field (V) 214, a modified field 216, and a physical page offset field 218.

An example of PTEs 220 that may be encoded in the clustered TLB entry format, along with the corresponding encoded TLB 222, is also shown in the figure. As indicated in the figure, all memory pages associated with the encoded TLB 222 share a base physical page number, but then are distinguished by individual offsets encoded in the individual sub-entry fields. For example, the mapping 0x8001000→0xABCA000 is reconstructed by using the virtual page offset of one (0x8001-0x8000=1), to select sub-entry #1. The physical page offset in sub-entry #1, indicated as 2 in the figure, is added to the base physical page (0xABC8+2=0xABCA), to compute the final physical page number (0xABCA000) where the least significant twelve bits (i.e., three hexadecimal digits) are always zero when assuming a 4 KB page size. Where an individual page is not mapped or is not able to be encoded in this format, the valid bit in the corresponding sub-entry is set to zero (represented by a '-' as shown in sub-entries 3, 4, and 6). In the case of a singleton PTE, either an entire clustered entry is used to encode the single PTE, which is not desirable as it underutilizes the full capabilities of the clustered TLB format, or a separate TLB structure that only supports non-encoded (e.g., non-clustered) TLB entries is maintained. Note that due to the additional sub-entry information, the size of a TLB entry supporting this clustered format is typically larger than that for the CoLT-style encoding or for a conventional un-encoded TLB entry.

These proposals for combining multiple TLB entries into a single coalesced or clustered TLB entry are limited, however, in that they support only a single form of encoding. As a result, the opportunities to encode multiple PTEs into an encoded TLB entry are such that only PTEs satisfying the conditions of the encoding scheme used are able to be encoded.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

The embodiments as described are advantageous in that they only make use of a single TLB structure/table while handling the multiple encodings. The methods and apparatus allow for the encoding of system page table entries, in various TLB entry encoding formats, into compressed encoding format TLB entries, which may be stored in a multiple compressed encoding format TLB. For example, the methods and apparatus obtain one or more system page table entries representing virtual system page to physical system page translations. The methods and apparatus determine a number of the obtained system page table entries that can be encoded in each of a plurality of TLB entry encoding formats. The methods and apparatus select one of the TLB entry encoding formats determined to encode at least one of the obtained system page table entries, and encode the determined number of obtained system page table entries in the selected TLB entry encoding format into a compressed encoding format TLB entry.

Briefly, in one example, a method and apparatus obtain one or more system page table entries that represent virtual system (e.g., memory) page to physical system page translations. The method and apparatus determine a number of the obtained system page table entries that can be encoded in each of a plurality of TLB entry encoding formats. For example, the method and apparatus may obtain system page table entries from a system page table that resides in memory, and determine how many of the obtained system page table entries may be encoded utilizing the CoLT encoding method, and how many may be encoded utilizing the clustered encoding method, to name a couple of TLB entry encoding methods (e.g., formats). The method and apparatus may select one of the TLB entry encoding formats that encode at least one of the obtained system page table entries. In one example, the method and apparatus select the TLB entry encoding format that can encode a highest number of the obtained system page table entries. As an example, if the method and apparatus determine that the CoLT encoding method may encode five of the obtained system page table entries, and that the clustered encoding method may encode ten of the obtained system page table entries, the method and apparatus may select the clustered encoding method, as that method may encode a highest number of obtained system page table entries. In one example, the highest number of obtained system page table entries is one, and the method and apparatus select a TLB entry encoding format that supports encoding individual system page table entries.

In one embodiment, the method and apparatus encode the determined number of obtained system page table entries in the TLB entry encoding format selected to encode a highest number of obtained system page table entries into a compressed encoding format TLB entry. For example, in continuing the example from just above, as the method and apparatus selected the clustered encoding method as being able to encode the highest number of system page table entries, in this example then, those ten system page table entries are encoded utilizing the clustered encoding method. In one example, the system page table entries are obtained by requesting a system page table entry from a hardware system page table walker that provides a cache-line including the requested system page table entry. In one example, the hardware system page table walker provides a plurality of consecutive system page table entries for every system page table entry requested. For example, the hardware page-table walker may provide a cache-line containing the requested system page table entry along with other adjacent system page table entries residing in the same cache-line.

For example, the hardware system page table walker may provide 8 byte system page table entries, or 16 byte system page table entries.

In one embodiment, the compressed encoding format TLB entry is stored into a multiple compressed encoding format TLB. For example, the multiple compressed encoding format TLB is capable of storing compressed encoding format TLB entries encoded utilizing the clustered encoding method, as well as compressed encoding format TLB entries encoded utilizing the CoLT encoding method. As such, the multiple compressed encoding format TLB supports the storing of TLB entries encoded in multiple TLB entry encoding formats.

In one embodiment, the compressed encoding format TLB entry is associated with an encoding format indication of the encoding format selected to encode the determined number of system page table entries. For example, and as discussed further below, the encoding format indication may take the form of a mode field as part of the compressed encoding format TLB entry, where the mode file indicates the encoding format utilized to encode the compressed encoding format TLB entry's associated system page table entries. In another example, the encoding format indication may be implemented in the form of a look-up table, where the lookup table includes encoding format indication elements associated with compressed encoding format TLB entries. In one example, the method and apparatus store the compressed encoding format TLB entry into a row of the multiple compressed encoding format TLB, and store an associated encoding format indication of the selected TLB entry encoding format in the same row.

In one embodiment, the method and apparatus receive a TLB lookup request to search the multiple compressed encoding format TLB for a requested virtual system page. The method and apparatus may select a compressed encoding format TLB entry from the multiple compressed encoding format TLB based on, for example, the requested virtual system page. The method and apparatus may, in one example, determine a TLB entry encoding format of the selected compressed encoding format TLB entry based on an associated encoding format indication. For example, as mentioned above, the encoding format may be indicated by a mode field of the selected compressed encoding format TLB entry. In one embodiment, the method and apparatus may decode the compressed encoding format TLB entry based on the determined TLB entry encoding format.

In one embodiment, the method and apparatus may decode the compressed encoding format TLB entry and determine whether the compressed encoding format TLB entry represents the requested virtual system page based on the contents of the decoded compressed encoding format TLB entry. The method and apparatus may provide a physical system page if the compressed encoding format TLB entry represents the requested virtual system page. For example, the method and apparatus may decode the compressed encoding format TLB entry utilizing, as an example, the clustered decoding method, to obtain the associated virtual system page to physical system page translations, and compare the requested virtual system page to one or more of the associated virtual system pages. If the comparison indicates that the requested virtual system page is represented (e.g., supported) by a virtual system page to physical system page translation associated with the compressed encoding format TLB entry, the physical system page is provided, such as to allow a proper virtual system page to physical system page translation. In one embodiment, the method and apparatus obtain additional system page table entries if the compressed encoding format TLB entry does not represent the requested virtual system page. In one embodiment, the method and apparatus select another compressed encoding format TLB entry, such as one from a multiple compressed encoding format TLB, to determine if it represents the requested virtual system page if the original compressed encoding format TLB entry does not represent the requested virtual system page.

Among other advantages, the methods and apparatus broaden the number of cases where PTEs may be encoded into a TLB entry to more fully realize the benefits of a TLB. For example, the methods and apparatus allow for the encoding of system page table entries, in various TLB entry encoding formats, into compressed encoding format TLB entries, which may be stored in a multiple compressed encoding format TLB. As such, the methods and apparatus provide opportunities to more efficiently encode system page table entries, thus reducing TLB misses. Reducing TLB misses directly improves TLB performance (e.g., no delays waiting for translations/page-table walks) and reduces energy consumption (e.g., no energy spent on page-table walks). In addition, the number of TLB entries may be reduced, as the methods and apparatus provide for encoding system page table entries in a TLB entry encoding format that is able to encode a higher number of system page table entries. Persons of ordinary skill in the art would recognize and appreciate further advantages as well.

Figure 3:
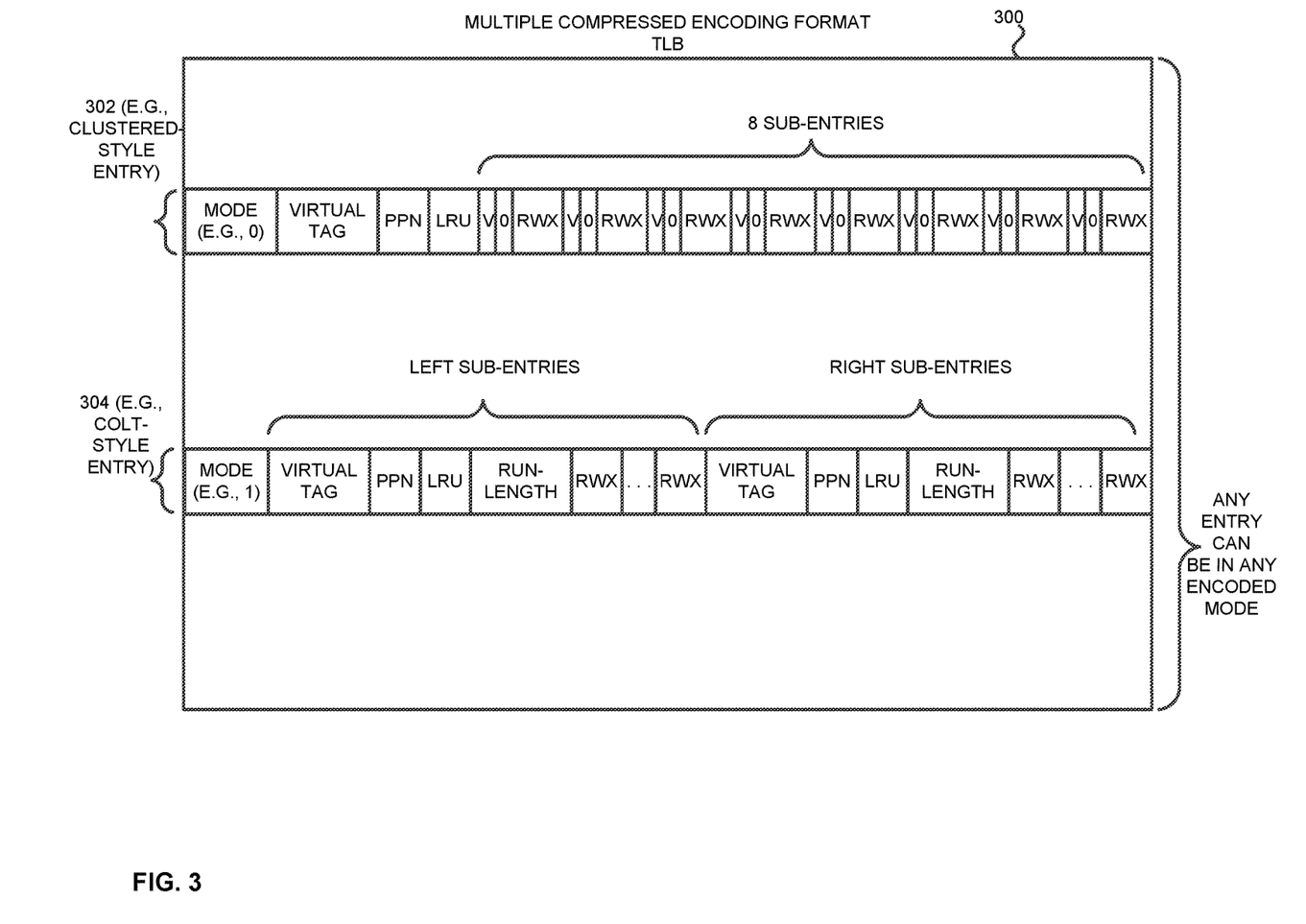
FIG. 3 is a diagram illustrating an example multiple compressed encoding format TLB that includes TLB entries encoded in multiple encoding formats in accordance with one example set forth in the disclosure.

Turning now to the drawings, one example of the presently disclosed multiple compressed encoding format TLB 300, as shown in FIG. 3, includes compressed encoding format TLB entries 302, 304 encoded in multiple encoding formats. In this example, compressed encoding format TLB entry 302 is encoded utilizing the clustered encoding method, and compressed encoding format TLB entry 304 is encoded utilizing the CoLT encoding method. Although only two compressed encoding format TLB entries are shown, one for each of two encoding formats, it is to be appreciated that the multiple compressed encoding format TLB 300 may support any number of compressed encoding format TLB entries, in the encoding formats indicated or others, as may be limited by the memory size of the multiple compressed encoding format TLB 300. As indicated, each compressed encoding format TLB entry 302, 304 includes a field to indicate the "mode" of the TLB entry (i.e., mode field), where the mode designates which type of encoding is currently being used by the entry.

In the clustered mode in this example (Mode=0), the compressed encoding format TLB entry 302 can support up to 8 sub-entries. The compressed encoding format TLB entry 302 entry includes a virtual page tag, a physical page number (PPN), replacement policy meta-data (LRU), and 8 sub-entries each with a valid bit (V), a physical address offset (O), and per-page read/write/execute permission bits (RWX). As also indicated in the figure, the compressed encoding format TLB entry 304 is encoded in the "CoLT" mode (Mode=1). Due to the smaller size of the CoLT encoding format in some embodiments, multiple CoLT-styled entries may be packed into a single compressed encoding format TLB entry. For example, compressed encoding format TLB entry 304 shows two such entries packed together side by side (left sub-entry and right sub-entry). Each sub-entry has a valid bit, a virtual page tag, a physical page number, a run-length field, a set of read/write/execute permission bits per physical page, and replacement policy meta-data.

Figure 4:
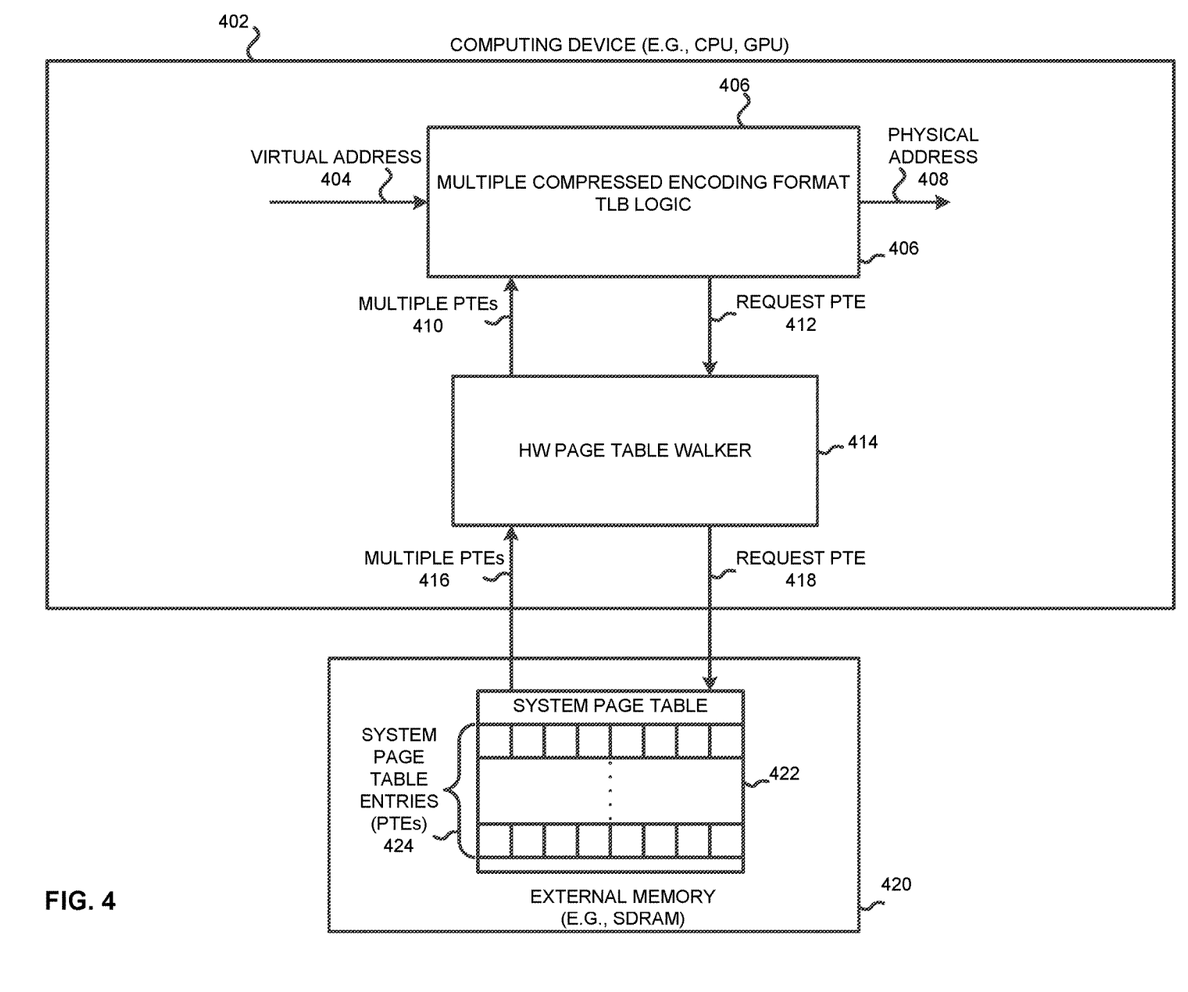
FIG. 4 is a functional block diagram illustrating an example of a computing device, such as a GPU, that includes multiple compressed encoding format TLB logic in accordance with one example set forth in the disclosure.

One example of the presently disclosed system, as shown in FIG. 4, is a computing device 402, such as a CPU or GPU, that includes multiple compressed encoding format TLB logic 406. The system may also include hardware page table walker 414, and system page table 422. System page table 422 may reside in external memory 420, which may be any suitable memory, such as random access memory (RAM) (e.g., SDRAM), or any other suitable memory. The system page table 422 may store system page table entries 424. In some embodiments, some or all of the functions of computing device 402 may be performed by any suitable processor or processors that may, for example, execute a software driver, firmware, or any other suitable executable code stored in memory. For example, some or all of the functions of multiple compressed encoding format TLB logic 406 may be performed by any suitable processing core. In some embodiments, multiple compressed encoding format TLB logic 406 may be a general processing GPU (GP GPU), an accelerated processing unit (APU), a central processing unit (CPU), a field programmable gate array (FPGA), an application-specific integrated circuit (ASIC), or any other suitable instruction processing device, or any other device that accesses virtual memory.

Multiple compressed encoding format TLB logic 406 is operable to receive a virtual address 404, such as in a TLB lookup request, to search a multiple compressed encoding format TLB for the requested virtual system page. Multiple compressed encoding format TLB logic 406 may provide a physical memory address 408, for example, in response to receiving the virtual address 404. For example, the provided physical memory address 408 may be a translation of the received virtual address 404.

Multiple compressed encoding format TLB logic 406 is operably connected to hardware page table walker 414 and may request one or more PTEs over communication link 412, and may receive multiple system page table entries, for example, over communication link 410. Although communication links 410 and 412 are shown as separate communication links, it is to be appreciated that the links may be implemented as one link, or in other forms as is recognized in the art. Multiple compressed encoding format TLB logic 406 is operable to encode one or more of the received multiple system page table entries in one of a plurality of TLB entry encoding formats into a compressed encoding format TLB entry, as is described above and in more detail below with respect to other figures. For example, upon receiving a virtual address 404, multiple compressed encoding format TLB logic 406 may receive multiple system page table entries from hardware page table walker 414 over communication link 410 to be encoded into a compressed encoding format TLB entry.

Hardware page table walker 414 is operably coupled to, and may request one or more system page table entries from, system page table 422, which may include system page table entries 424 stored in external memory 420. For example, upon receiving a request for multiple system page table entries, hardware page table walker 414 may perform a memory page-table walk over system page table 422 by requesting one or more system page table entries over communication link 418. In response, hardware page table walker 414 may receive multiple system page table entries over communication link 416, and provide the multiple system page table entries to multiple compressed encoding format TLB logic 406 over communication link 410.

Figure 5:
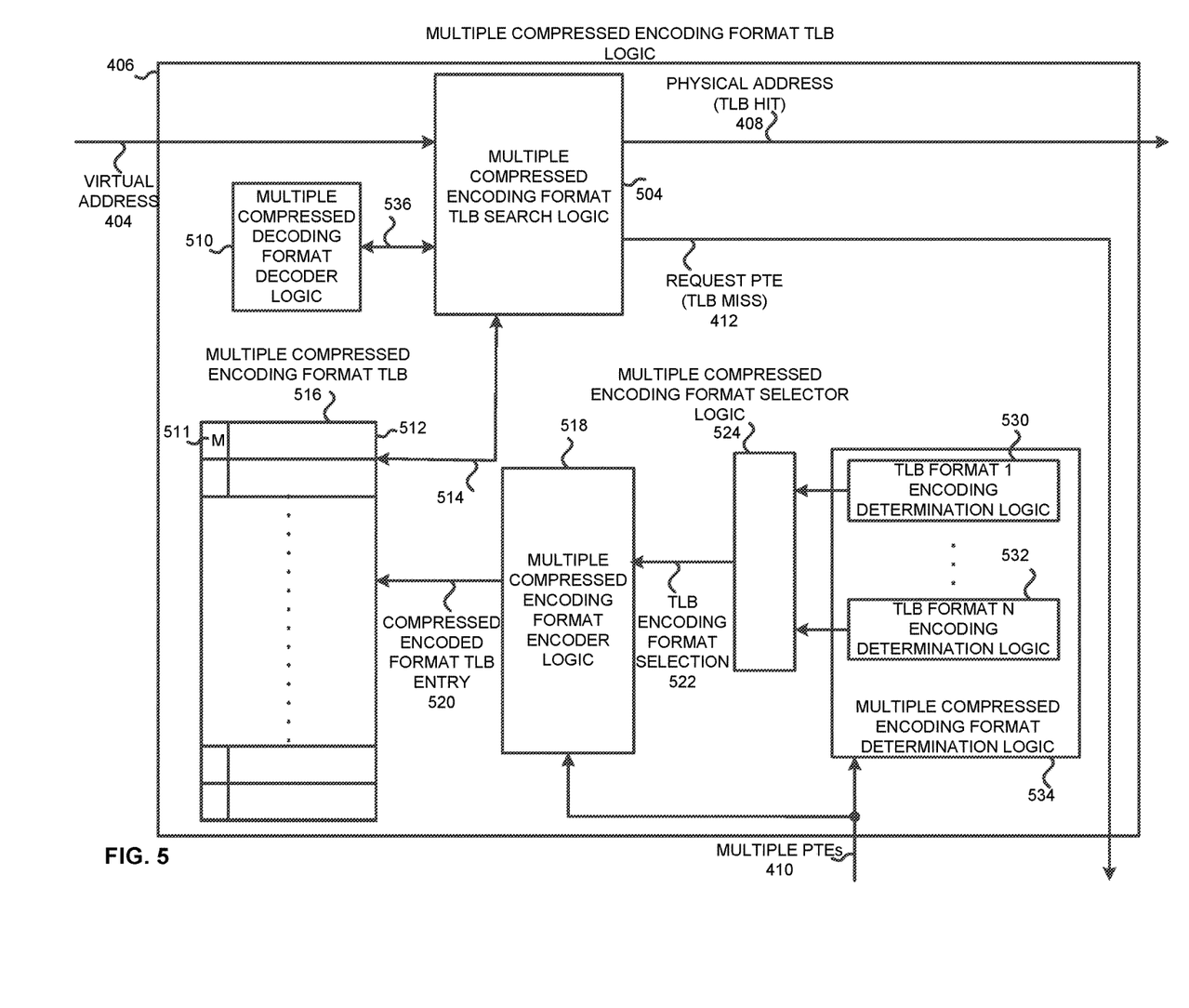
FIG. 5 is a more detailed functional block diagram of the multiple compressed encoding format TLB logic of FIG. 4 that includes multiple compressed encoding format encoder logic in accordance with one example set forth in the disclosure.

FIG. 5 is a more detailed functional block diagram of the multiple compressed encoding format TLB logic 406 of FIG. 4. As indicated in the figure, multiple compressed encoding format TLB logic 406 includes multiple compressed encoding format TLB search logic 504, which may receive virtual address 404 (e.g., a requested virtual system page). The multiple compressed encoding format TLB search logic 504 is operably coupled to the multiple compressed encoding format TLB 516 and is operable to obtain stored compressed encoding format TLB entries 512 from the multiple compressed encoding format TLB 516 over, for example, communication link 514. Multiple compressed encoding format TLB search logic 504 may also be operable to determine one of a plurality of TLB entry encoding formats of a compressed encoding format TLB entry based on, for example, an associated encoding format indication of the compressed encoding format TLB entry. Multiple compressed encoding format TLB search logic 504 is also operably coupled to multiple compressed decoding format decoder logic 510, and is operable to provide compressed encoding format TLB entries to multiple compressed decoding format decoder logic 510 over communication link 536. Multiple compressed encoding format TLB search logic 504 may also provide to multiple compressed decoding format decoder logic 510 a determined encoding format indication associated with a compressed encoding format TLB entry.

Multiple compressed decoding format decoder logic 510 is operable to decode compressed encoding format TLB entries, and provide the contents of the decoded compressed encoding format TLB entries to multiple compressed encoding format TLB search logic 504 over communication link 536. In one example, multiple compressed decoding format decoder logic 510 decodes compressed encoding format TLB entries based on their associated encoding format indications.

Multiple compressed encoding format TLB search logic 504 is operable to determine whether a compressed encoding format TLB entry represents the requested virtual address 404 based on the contents of the decoded compressed encoding format TLB entry. If the compressed encoding format TLB entry does represent the requested virtual address 404 (e.g., TLB hit), multiple compressed encoding format TLB search logic 504 may provide physical address 408 (e.g., a physical system page) based on the contents of the decoded compressed encoding format TLB entry. If the compressed encoding format TLB entry does not represent the requested virtual address 404 (e.g., TLB miss), multiple compressed encoding format TLB search logic 504 may request one or more system page table entries 412, as described above with respect to FIG. 4. In response, multiple system page table entries 410 may be provided to multiple compressed encoding format determination logic 534, and may also be provided to multiple compressed encoding format encoder logic 518.

As indicated in the figure, multiple compressed encoding format determination logic 534 may include TLB format 1 encoding determination logic 530 and TLB format N encoding determination logic 532. Upon receiving multiple system page table entries 410, multiple compressed encoding format determination logic 534 is operable to provide the multiple system page table entries to one or more of the TLB format encoding determination logics 530, 532. Although only two TLB format encoding determination logics 530, 532 are indicated in the figure (merely for simplicity purposes), any suitable number of TLB format encoding determination logics may be implemented. Each TLB format encoding determination logic 530, 532 is associated with a TLB entry encoding format (e.g., clustered encoding format or CoLT encoding format) and is operable to determine whether one or more system page table entries may be encoded in the associated TLB entry encoding format, and may also determine the number of system page table entries that are able to be encoded in that format.

Multiple compressed encoding format selector logic 524 is operable to select at least one of the TLB entry encoding formats that were determined to encode one or more system page table entries. In one example, encoding format selector logic 524 selects the TLB entry encoding format that can encode a highest number of system page table entries. Encoding format selector logic 524 may also be operable to provide TLB encoding format selection 522 to multiple compressed encoding format encoder logic 518 thereby indicating the selected TLB entry encoding format.

As indicated in the figure, multiple compressed encoding format encoder logic 518 receives multiple system page table entries 410. As such, multiple compressed encoding format encoder logic 518 is operable to encode one or more system page table entries into a compressed encoding format TLB entry in a plurality of TLB entry encoding formats. For example, multiple compressed encoding format encoder logic 518 may encode one or more of the received multiple system page entries 410 into a compressed encoding format TLB entry in the TLB entry encoding format indicated by TLB encoding format selection 522.

Multiple compressed encoding format encoder logic 518 may be operably coupled to multiple compressed encoding format TLB 516, and as such may provide the compressed encoded format TLB entry 520 to multiple compressed encoding format TLB 516. For example, multiple compressed encoding format encoder logic 518 may store the compressed encoded format TLB entry 520 into multiple compressed encoding format TLB 516, as is indicated by stored compressed encoding format TLB entry 512. Multiple compressed encoding format encoder logic 518 may also be operable to associate the compressed encoding format TLB entry with an encoding format indication received in the TLB encoding format selection 522. For example, after encoding, the compressed encoded format TLB entry 520 may include (e.g., append) a mode field within the compressed encoding format TLB entry to indicate the TLB entry encoding format utilized to encode the compressed encoded format TLB entry 520. As such, and as indicated in the figure, stored encoded format TLB entry 512 may include an encoding format indication 511.

Figure 6:
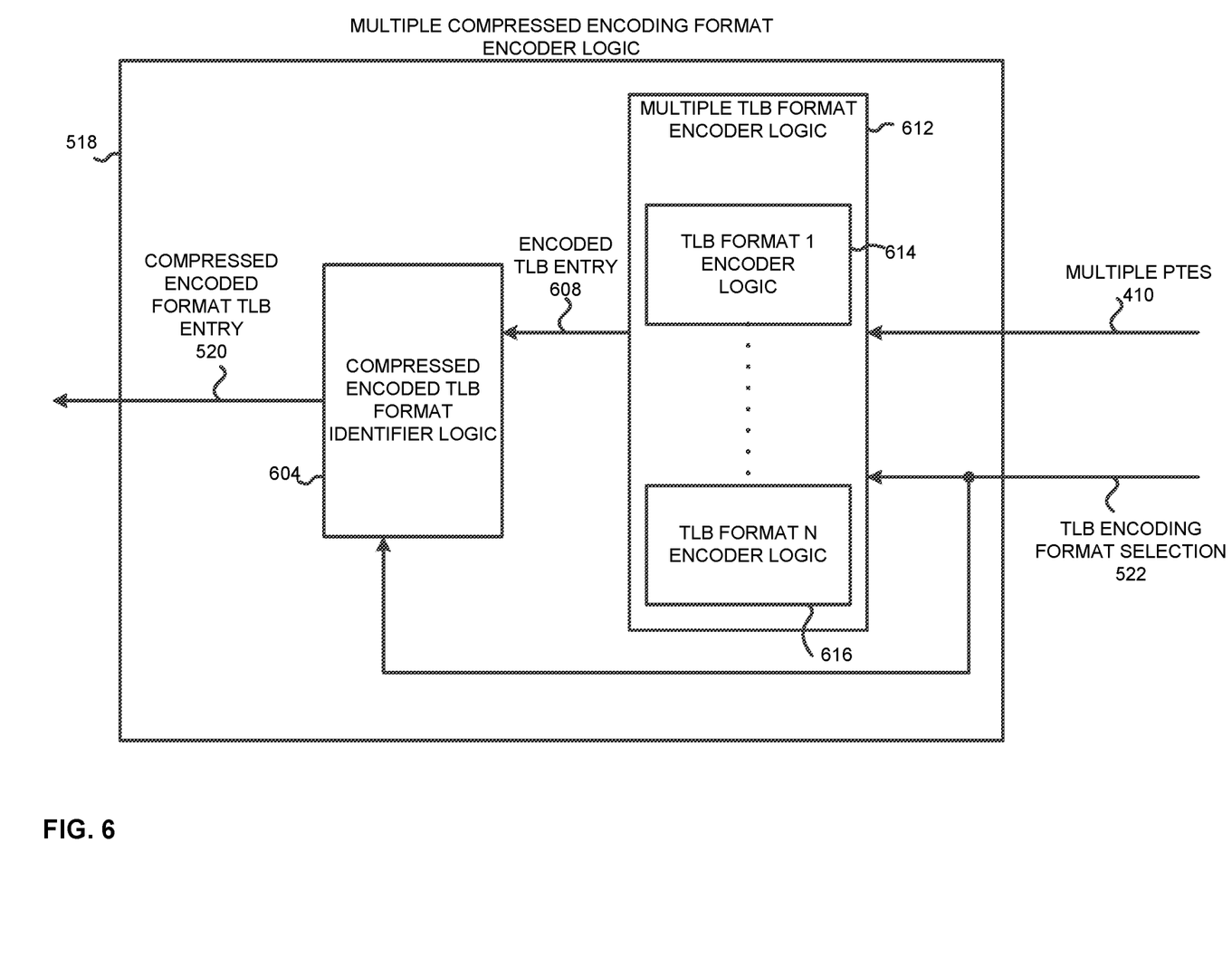
FIG. 6 is a more detailed functional block diagram of one example of the multiple compressed encoding format encoder logic of FIG. 5 in accordance with one example set forth in the disclosure.

FIG. 6 is a more detailed functional block diagram of one example of the multiple compressed encoding format encoder logic 518 of FIG. 5. As indicated in the figure, multiple compressed encoding format encoder logic 518 may include multiple TLB format encoder logic 612 and compressed encoded TLB format identifier logic 604. Multiple TLB format encoder logic 612 receives multiple system page table entries 410 and TLB encoding format selection 522, and is operable to encode one or more multiple system page table entries 410 into encoded TLB entry 608 utilizing any one of a plurality of TLB entry encoding formats. For example, as indicated in the figure, multiple TLB format encoder logic 612 includes TLB format 1 encoder logic 614 and TLB format N encoder logic 616, where each of the TLB format encoder logics 614, 616 may encode one or more system page table entries into encoded TLB entry 608 using a particular TLB entry encoding format. Although only two TLB format encoder logics 614, 616 are indicated in the figure (merely for simplicity purposes), any suitable number of TLB format encoder logics may be implemented. Multiple TLB format encoder logic 612 is operable to select one or more of the TLB format encoder logics 614, 616 to encode one or more received multiple system page table entries 410 into an encoded TLB entry 608. For example, multiple TLB format encoder logic 612 is operable to select a TLB format encoder logic 614, 616 based on the TLB entry encoding format indicated by TLB encoding format selection 522, to encode multiple system page table entries 410 into encoded TLB entry 608 utilizing the indicated TLB entry encoding format.

Compressed encoded TLB format identifier logic 604 is operably coupled to multiple TLB format encoder logic 612 and may receive encoded TLB entry 608, and may also receive TLB encoding format selection 522. Compressed encoded TLB format identifier logic 604 is operable to provide compressed encoded format TLB entry 520 based on encoded TLB entry 608. For example, compressed encoded TLB format identifier logic 604 may receive encoded TLB entry 608, and based on the data contents of encoded TLB entry 608, provide compressed encoded format TLB entry 520 to be stored, for example, in multiple compressed encoding format TLB 516 of FIG. 5. Compressed encoded TLB format identifier logic 604 may also associate the compressed encoding format TLB entry 520 with an encoding format indication as indicated by TLB encoding format selection 522, and as further described above.

Figure 7:
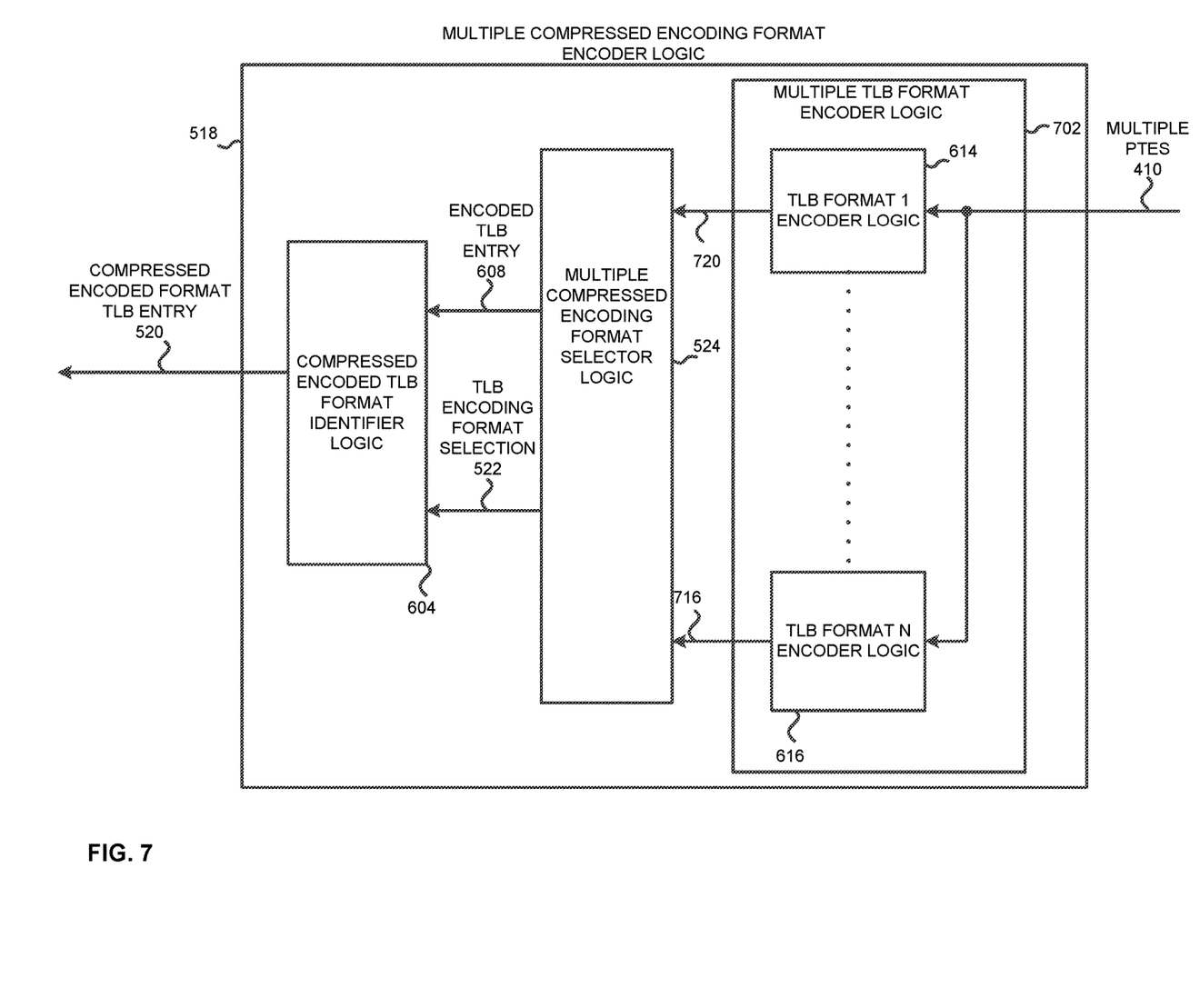
FIG. 7 is another detailed functional block diagram of another example of the multiple compressed encoding format encoder logic of FIG. 5 in accordance with one example set forth in the disclosure.

FIG. 7 is another detailed functional block diagram of another example of the multiple compressed encoding format encoder logic 518 of FIG. 5. In this example, multiple compressed encoding format encoder logic 518 includes multiple compressed encoding format selector logic 524, compressed encoded TLB format identifier logic 604, and multiple TLB format encoder logic 702. In this example, multiple TLB format encoder logic 702 receives multiple system page entries 410 and provides them to a plurality of TLB format encoder logics 614, 616. As mentioned above with respect to FIG. 6, although only two TLB format encoder logics 614, 616 are indicated in the figure, any suitable number of TLB format encoder logics may be implemented. As such, a plurality of TLB format encoder logics 614, 616 each encode multiple system page entries 410 and provide TLB format encoded TLB entries 720, 716 to multiple compressed encoding format selector logic 524. In this example, multiple compressed encoding format selector logic 524 is operable to determine a number of encoded system page table entries encoded by each TLB format encoder logics 614, 616 based on the provided TLB format encoded TLB entries 720, 716. In one embodiment, multiple TLB format encoder logic 702 provides the number of encoded system page table entries encoded by each TLB format encoder logic 614, 616 as part of the provided TLB format encoded TLB entries 720, 716. Multiple compressed encoding format selector logic 524 may be operable to select at least one of the TLB entry encoding formats that were determined to encode one or more system page table entries. In one example, multiple compressed encoding format selector logic 524 selects the TLB entry encoding format encoding a highest number of system page table entries. Multiple compressed encoding format selector logic 524 may then provide TLB encoding format selection 522, which indicates the selected TLB entry encoding format, and encoded TLB entry 704, which is an encoded TLB entry corresponding to the TLB format encoded TLB entry 720, 716 encoded in the selected TLB entry encoding format, to compressed encoded TLB format identifier logic 604. As described with respect to FIG. 6, compressed encoded TLB format identifier logic 604 may provide compressed encoded format TLB entry 520 based on encoded TLB entry 608.

Figure 8:
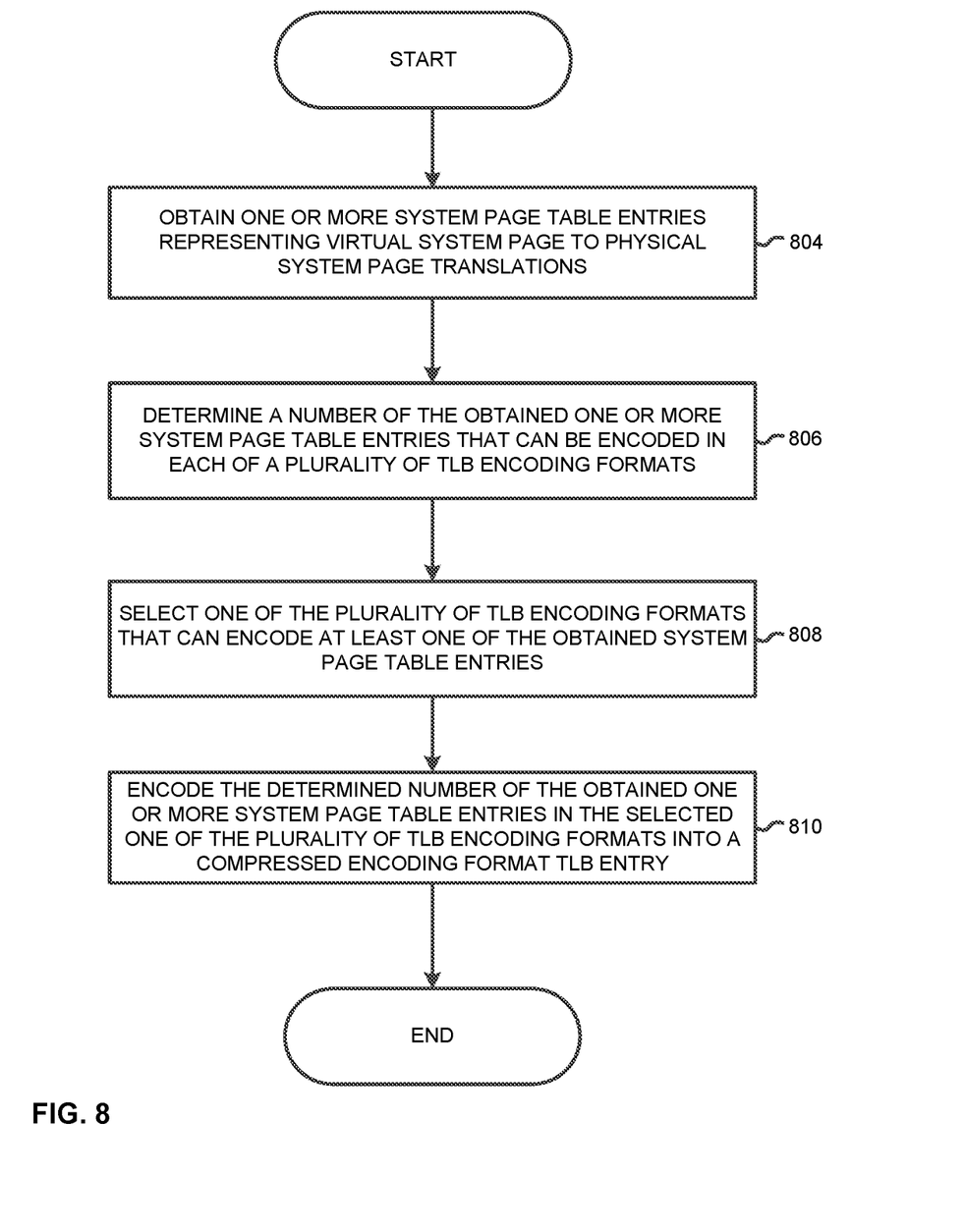
FIG. 8 is a flowchart of an example method for encoding one or more system page table entries into compressed encoding format TLB entries in accordance with one example set forth in the disclosure.

FIG. 8 is a flowchart of an example method for encoding one or more system page table entries into compressed encoding format TLB entries. The method illustrated in FIG. 8, and each of the example methods described herein, may be carried out by computing device 402, or by multiple compressed encoding format TLB logic 406. As such, the methods may be carried out by hardware or a combination of hardware and hardware executing software. Suitable hardware may include one or more GPUs, CPUs, APUs, ASICs, state machines, FPGAs, digital signal processors (DSPs), or other suitable hardware. Although the methods are described with reference to the illustrated flowcharts (e.g., in FIG. 8), it will be appreciated that many other ways of performing the acts associated with the methods may be used. For example, the order of some operations may be changed, and some of the operations described may be optional. Additionally, while the methods may be described with reference to the example computing device 402, it will be appreciated that the methods may be implemented by other apparatus as well, and that computing device 402 may implement other methods.

The example flowchart begins at block 804, where one or more system page table entries, representing virtual system page to physical system page translations, are obtained. The method proceeds to block 806, where a number of the obtained system page table entries that can be encoded in each of a plurality of TLB encoding formats are determined. For example, the method may determine a number of the obtained system page table entries that can be encoded via the CoLT encoding method, and a number of the obtained system page table entries that can be encoded via the clustered encoding method. The method then continues to block 808 where one of the plurality of TLB encoding formats that can encode at least one system page table entry is selected. The method then proceeds to block 810, where the determined number of the system page table entries that can be encoded in the selected TLB encoding format are encoded in the selected TLB encoding format into a compressed encoding format TLB entry. For example, if the CoLT encoding method is selected, then the determined number of system page table entries that may be encoded in that format are encoded utilizing the CoLT encoding method. The method then ends.

Figure 9:
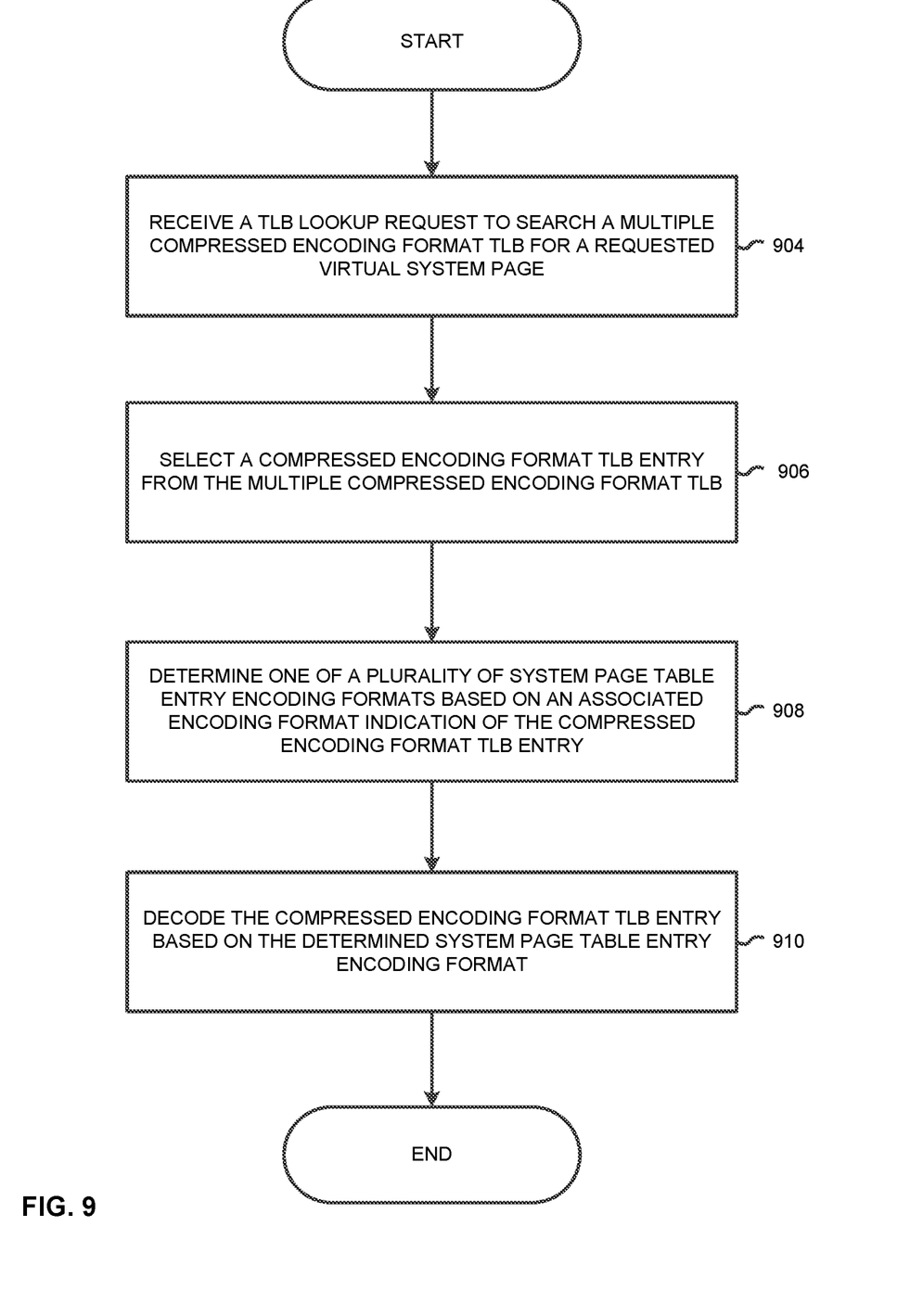
FIG. 9 is a flowchart of an example method for decoding compressed encoding format TLB entries in accordance with one example set forth in the disclosure.

FIG. 9 is a flowchart of an example method for decoding compressed encoding format TLB entries. The method begins at block 904, where a TLB lookup request is received to search a multiple compressed encoding format TLB for a requested virtual system page. The method proceeds to block 906, where a compressed encoding format TLB entry is selected from the multiple compressed encoding format TLB. The method continues to block 908, where a system page table entry encoding format is determined based on an associated encoding format indication of the compressed encoding format TLB entry. For example, as discussed above, the compressed encoding format TLB entry may include a mode field which indicates the TLB entry encoding method used to encode the compressed encoding format TLB entry. The method continues to block 910 where the selected compressed encoding format TLB entry is decoded based on the determined system page table entry encoding format. The method then ends.

Figure 10:
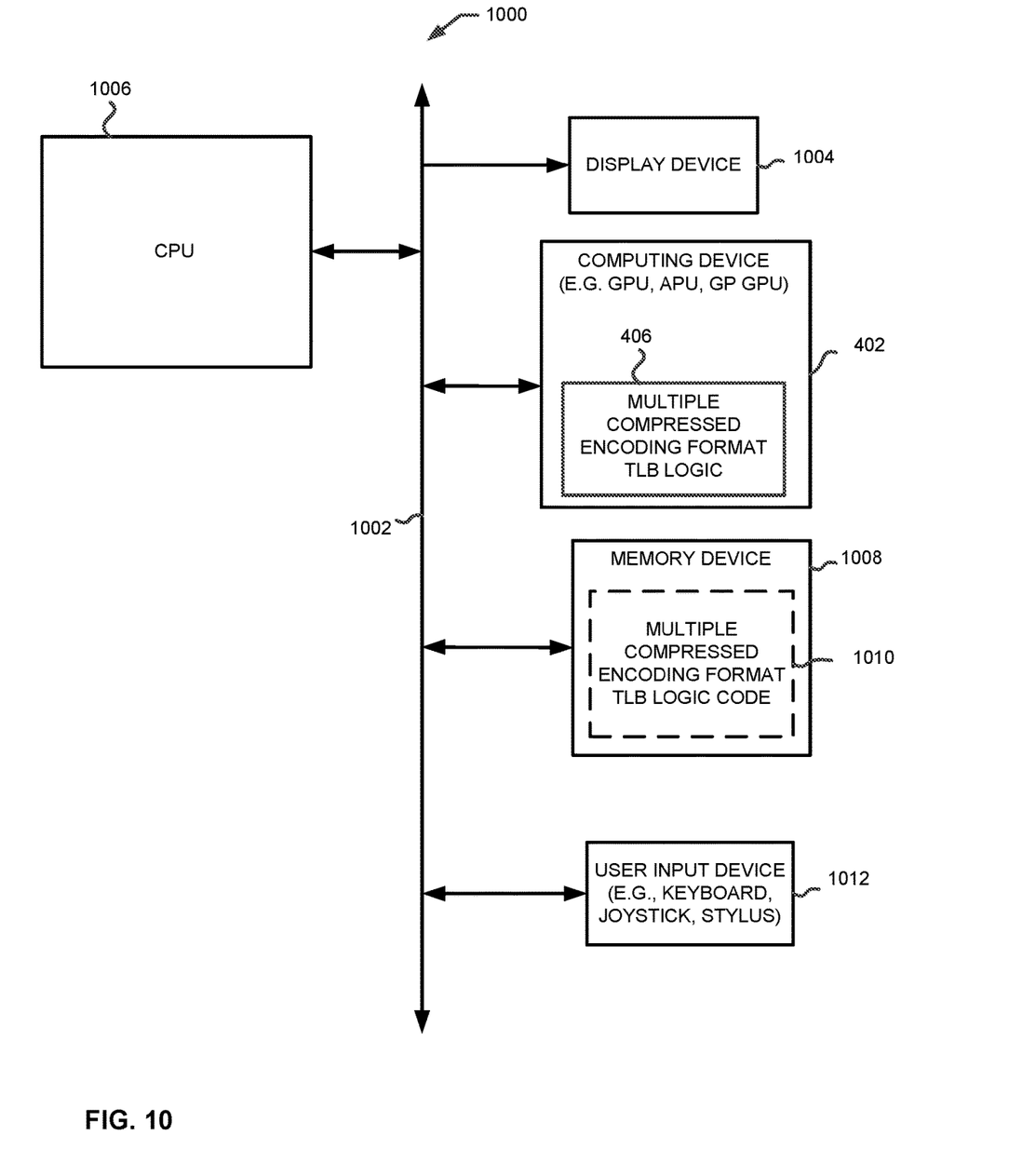
FIG. 10 is an example system that includes the computing device with multiple compressed encoding format TLB logic of FIG. 4, and multiple compressed encoding format TLB logic code residing in memory, in accordance with one example set forth in the disclosure.

FIG. 10 is a functional block diagram illustrating an example apparatus 1000 employing a computing device 402 that includes multiple compressed encoding format TLB logic 406 operatively coupled to expansion bus 1002. Apparatus 1000 may also include additional computing devices, such as CPU 1006. Apparatus 1000 may also include display device 1004, and memory device 1008 that may store multiple compressed encoding format TLB logic code 1010. As indicated, each device may be operatively coupled to expansion bus 1002.

In some examples, executable suitable instructions may be stored on a non-transitory computer readable storage medium, where the executable instructions are executable by one or more processors to cause the one or more processors to perform the actions described herein. Referring back to FIG. 10, memory device 1008 may store executable instructions, including multiple compressed encoding format TLB logic code 1010, to be executed by computing device 402 and/or multiple compressed encoding format TLB logic 406. Memory device 1008 may be any suitable memory, such as random access memory (RAM), non-volatile memory (e.g., read-only memory (ROM), flash memory, EPROM, EEPROM, etc.), a disk storage device, or any other suitable memory that may store executable instructions. Computing device 402 is operatively coupled to memory device 1008, for example via expansion bus 1002, such that computing device 402 may obtain multiple compressed encoding format TLB logic code 1010 from memory device 1008 for execution.

Some or all of this functionality may also be implemented in any other suitable manner such as, but not limited to, a software implementation including, for example, a driver implementation, a firmware implementation, a hardware implementation, or any suitable combination of the example implementations described above.

Among other advantages, the methods and apparatus allow for the encoding of system page table entries, in various TLB entry encoding formats, into compressed encoding format TLB entries, which may be stored in a multiple compressed encoding format TLB. As such, the methods and apparatus provide opportunities to more efficiently encode system page table entries, thus reducing TLB misses. Reducing TLB misses directly improves TLB performance (e.g., no delays waiting for translations/page-table walks) and reduces energy consumption (e.g., no energy spent on page-table walks). In addition, the number of TLB entries may be reduced, as the methods and apparatus provide for encoding system page table entries in a TLB entry encoding format that is able to encode a higher number of system page table entries. Persons of ordinary skill in the art would recognize and appreciate further advantages as well.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations, or equivalents that fall within the scope of the basic underlying principles disclosed above and claimed herein.

What is claimed is:
1. A method, by a computing device, for encoding translation lookaside buffer (TLB) entries comprising:
obtaining, by the computing device, one or more system page table entries representing virtual system page to physical system page translations;

determining, by the computing device, a number of the obtained one or more system page table entries that can be encoded in each of a plurality of TLB entry encoding formats;

selecting, by the computing device, one of the plurality of TLB entry encoding formats determined to encode at least one of the obtained system page table entries;

encoding, by the computing device, the determined number of the obtained one or more system page table entries in the selected one of the plurality of TLB entry encoding formats into a compressed encoding format TLB entry;

associating the compressed encoding format TLB entry with an encoding format indication that indicates the selected one of the plurality of TLB entry encoding formats used to produce the compressed encoding format TLB entry; and storing the compressed encoding format TLB entry into a multiple compressed encoding format TLB.

2. The method of claim 1 wherein selecting one of the plurality of TLB entry encoding formats comprises selecting the TLB entry encoding format that can encode a highest number of the obtained one or more system page table entries.

3. The method of claim 1 further comprising:
receiving a TLB lookup request to search the multiple compressed encoding format TLB for a requested virtual system page;
selecting the compressed encoding format TLB entry;
determining one of the plurality of TLB entry encoding formats based on the associated encoding format indication of the compressed encoding format TLB entry; and
decoding the compressed encoding format TLB entry based on the determined one of the plurality of TLB entry encoding formats.

4. The method of claim 3 further comprising:
determining whether the compressed encoding format TLB entry represents the requested virtual system page based on the contents of the decoded compressed encoding format TLB entry; and
providing a physical system page if the compressed encoding format TLB entry represents the requested virtual system page.

5. The method of claim 4 further comprising obtaining additional system page table entries if the compressed encoding format TLB entry does not represent the requested virtual system page.

6. The method of claim 1 wherein:
the compressed encoding format TLB entry is stored into a row of the multiple compressed encoding format TLB, and
the associated encoding format indication of the selected one of the plurality of TLB entry encoding formats is stored in the same row of the multiple compressed encoding format TLB.

7. The method of claim 1 wherein obtaining one or more system page table entries includes requesting a system page table entry from a hardware system page table walker that provides a cache-line including the requested system page table entry.

8. A computing device comprising:
multiple compressed encoding format determination logic operable to:
obtain one or more system page table entries representing virtual system page to physical system page translations; and
determine a number of the obtained one or more system page table entries that can be encoded in each of a plurality of translation lookaside buffer entry encoding formats;

multiple compressed encoding format selector logic operable to select one of the plurality of TLB entry encoding formats that can encode at least one of the obtained one or more system page table entries;

multiple compressed encoding format encoder logic operable to:
encode the determined number of the obtained one or more system page table entries in the selected one of the plurality of TLB entry encoding formats into a compressed encoding format TLB entry;
associate the compressed encoding format TLB entry with an encoding format indication that indicates the selected one of the plurality of TLB entry encoding formats used to produce the compressed encoding format TLB entry; and
store the compressed encoding format TLB entry into a multiple compressed encoding format TLB.

9. The computing device of claim 8 wherein the multiple compressed encoding format selector logic is operable to select one of the plurality of TLB entry encoding formats that can encode a highest number of the obtained one or more system page table entries.

10. The computing device of claim 8 comprising:
multiple compressed encoding format TLB search logic operable to:
receive a TLB lookup request to search the multiple compressed encoding format TLB for a requested virtual system page;
select the compressed encoding format TLB entry; and
determine one of the plurality of TLB entry encoding formats based on the associated encoding format indication of the compressed encoding format TLB entry; and
multiple compressed decoding format decoder logic operable to decode the compressed encoding format TLB entry based on the determined one of the plurality of TLB entry encoding formats.

11. The computing device of claim 10 wherein the multiple compressed encoding format TLB search logic is operable to:
determine whether the compressed encoding format TLB entry represents the requested virtual system page based on the contents of the decoded compressed encoding format TLB entry; and
provide a physical system page if the compressed encoding format TLB entry represents the requested virtual system page.

12. The computing device of claim 11 wherein the multiple compressed encoding format determination logic is operable to obtain additional system page table entries if the compressed encoding format TLB entry does not represent the requested virtual system page.

13. The computing device of claim 8 wherein the multiple compressed encoding format encoder logic is operable to:
store the compressed encoding format TLB entry into a row of the multiple compressed encoding format TLB, and
store the associated encoding format indication of the selected one of the plurality of TLB entry encoding formats in the same row of the multiple compressed encoding format TLB.

14. The computing device of claim 8 wherein the multiple compressed encoding format determination logic is operable to obtain the one or more system page table entries by requesting a system page table entry from a hardware system page table walker that provides a cache-line including the requested system page table entry.

15. A non-transitory computer readable medium comprising executable instructions that when executed by one or more processors cause the one or more processors to:
- obtain one or more system page table entries representing virtual system page to physical system page translations;
- determine a number of the obtained one or more system page table entries that can be encoded in each of a plurality of translation lookaside buffer entry encoding formats;
- select one of the plurality of TLB entry encoding formats that can encode a at least one of the obtained one or more system page table entries;
- encode the determined number of the obtained one or more system page table entries in the selected one of the plurality of TLB entry encoding formats into a compressed encoding format TLB entry;
- associate the compressed encoding format TLB entry with an encoding format indication that indicates the selected one of the plurality of TLB entry encoding formats used to produce the compressed encoding format TLB entry; and
- store the compressed encoding format TLB entry into a multiple compressed encoding format TLB.

16. The non-transitory computer readable medium of claim 15 wherein the executable instructions cause the one or more processors to select one of the plurality of TLB entry encoding formats that can encode a highest number of the obtained one or more system page table entries.

17. The non-transitory computer readable medium of claim 15 wherein the executable instructions cause the one or more processors to:
- receive a TLB lookup request to search the multiple compressed encoding format TLB for a requested virtual system page;
- select the compressed encoding format TLB entry;
- determine one of the plurality of TLB entry encoding formats based on the associated encoding format indication of the compressed encoding format TLB entry; and
- decode the compressed encoding format TLB entry based on the determined one of the plurality of TLB entry encoding formats.

* * * * *